United States Patent
Jung et al.

(10) Patent No.: US 9,812,157 B1
(45) Date of Patent: Nov. 7, 2017

(54) LATERAL SPIN VALVE READER AND FABRICATION METHOD THEREOF

(71) Applicant: Seagate Technology LLC, Cupertino, CA (US)

(72) Inventors: Wonjoon Jung, Eden Prairie, MN (US); Thomas Roy Boonstra, Chaska, MN (US); Sung-Hoon Gee, Eden Prairie, MN (US); David A. Deen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/451,084

(22) Filed: Mar. 6, 2017

Related U.S. Application Data

(60) Provisional application No. 62/304,470, filed on Mar. 7, 2016.

(51) Int. Cl.
G11B 5/39 (2006.01)
G11B 5/31 (2006.01)

(52) U.S. Cl.
CPC .......... *G11B 5/3948* (2013.01); *G11B 5/3169* (2013.01); *G11B 5/39* (2013.01)

(58) Field of Classification Search
CPC ........ G11B 5/39; G11B 5/3948; G11B 5/3969
USPC ........................................................ 360/316
See application file for complete search history.

(56) References Cited

U.S. PATENT DOCUMENTS

| | | | |
|---|---|---|---|
| 7,209,328 B2 | 4/2007 | Ito et al. | |
| 7,280,322 B2 | 10/2007 | Takahashi et al. | |
| 7,298,597 B2 | 11/2007 | Carey et al. | |
| 7,522,392 B2 | 4/2009 | Carey et al. | |
| 8,072,713 B2 | 12/2011 | Yamada et al. | |
| 9,042,061 B2 | 5/2015 | Dimitrov et al. | |
| 9,064,509 B2 | 6/2015 | Dimitrov et al. | |
| 9,123,361 B1* | 9/2015 | Kief | G11B 5/265 |
| 9,269,383 B1 | 2/2016 | Hattori et al. | |
| 9,478,240 B1* | 10/2016 | Deen | G11B 5/3951 |
| 9,614,063 B2* | 4/2017 | Friedman | H01L 29/66984 |
| 9,685,178 B1* | 6/2017 | Deen | G11B 5/397 |
| 2006/0022220 A1 | 2/2006 | Inomata et al. | |
| 2007/0253116 A1 | 11/2007 | Takahashi et al. | |
| 2007/0253121 A1 | 11/2007 | Yamada et al. | |
| 2010/0119875 A1 | 5/2010 | Sasaki | |
| 2015/0303059 A1* | 10/2015 | Friedman | H01L 29/4236 257/29 |

\* cited by examiner

*Primary Examiner* — Allen T Cao
(74) *Attorney, Agent, or Firm* — Westman, Champlin & Koehler, P.A.

(57) ABSTRACT

A lateral spin valve reader and fabrication method thereof. The method includes forming an injector, a detector and a common channel layer that extends from the injector to the detector. The method also includes forming a first channel layer between the common channel layer and at least one of the injector or the detector with the first channel layer in contact with the common channel layer, thereby providing an interface between the first channel layer and the common channel layer.

20 Claims, 14 Drawing Sheets

LATERAL SPIN VALVE READER AND FABRICATION METHOD THEREOF

CROSS-REFERENCE TO RELATED APPLICATIONS

The present application is based on and claims the benefit of U.S. provisional patent application Ser. No. 62/304,470, filed Mar. 7, 2016, the content of which is hereby incorporated by reference in its entirety.

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor has traditionally been employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

The ever increasing need for increased data storage necessitates ever increasing data density in magnetic data storage devices. One way to increase data density is to decrease the size and spacing of magnetic bits recorded on the media. The read sensor is generally sandwiched between a pair of magnetic shields, the spacing between which determines the bit length, also referred to as gap thickness. Sensors such as GMR or TMR sensors are constructed as a stack of layers all formed upon one another sandwiched between the magnetic shields. Accordingly, the ability to reduce the spacing between shields with such a sensor structure is limited.

SUMMARY

The present disclosure relates to a lateral spin valve reader that addresses scaling challenges posed by greater data density requirements and includes one or more features that increase an amplitude of a bit detection signal.

In one embodiment, a method of fabricating a lateral spin valve reader is provided. The method includes forming an injector, a detector and a common channel layer that extends from the injector to the detector. The method also includes forming a first channel layer between the common channel layer and at least one of the injector or the detector with the first channel layer in contact with the common channel layer, thereby providing an interface between the first channel layer and the common channel layer.

In another embodiment, a lateral spin valve reader is provided. The lateral spin valve reader includes an injector, a detector and a common channel layer that extends from the injector to the detector. The lateral spin valve reader further includes a first channel layer between the common channel layer and at least one of the injector or the detector with the first channel layer in contact with the common channel layer, thereby providing an interface between the first channel layer and the common channel layer.

In yet another embodiment, a multi-sensor reader within a single recording head is provided. The multi-sensor reader includes a plurality of lateral spin valve sensors stacked one above the other. Each of the plurality of lateral spin valve sensors includes an injector, a detector and a common channel layer that extends from the injector to the detector. Each of the plurality of lateral spin valve sensors further includes a first channel layer between the common channel layer and at least one of the injector or the detector with the first channel layer in contact with the common channel layer, thereby providing an interface between the first channel layer and the common channel layer.

Other features and benefits that characterize embodiments of the disclosure will be apparent upon reading the following detailed description and review of the associated drawings.

DETAILED DESCRIPTION OF ILLUSTRATIVE EMBODIMENTS

It should be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Magnetic reader embodiments described below relate to lateral spin valve (LSV) readers that include a spin injector, a detector and a channel extending from the spin injector to the detector. The spin injector injects electron spins into the channel, which transports the spins to the detector. At the detector, the spins aid in detecting bits stored on a magnetic data storage medium. To increase an amplitude of the bit detection signal, different embodiments employ a multi-layered channel. Prior to providing additional details regarding the different embodiments, a description of an illustrative operating environment is provided below in connection with FIGS. 1 and 2.

Figure 1:
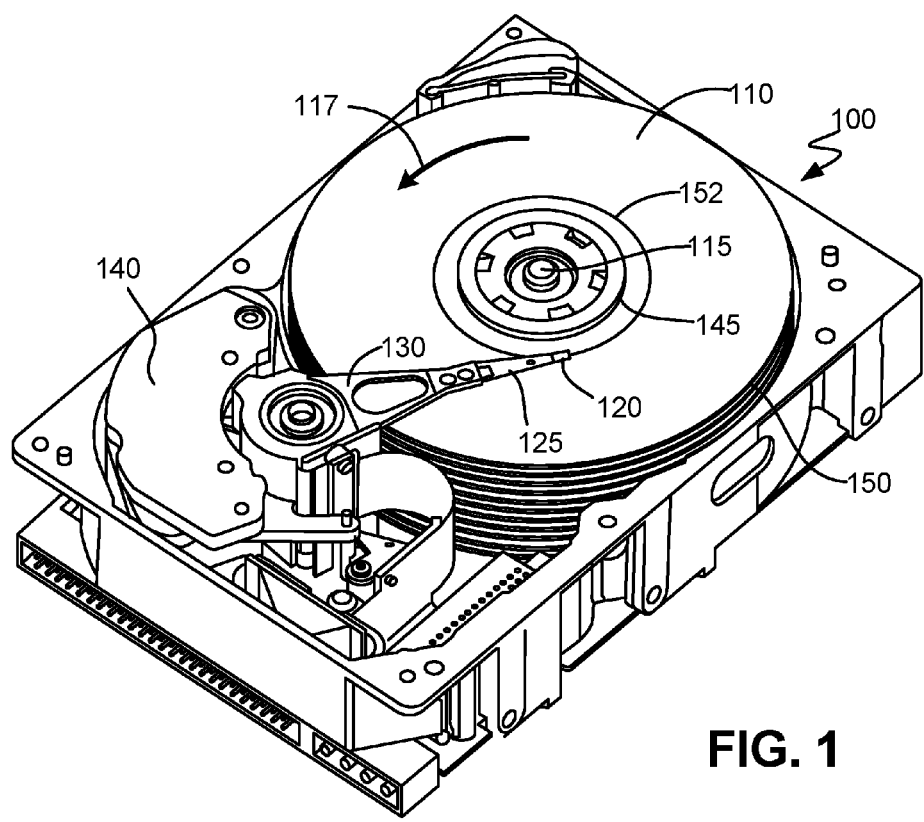
FIG. 1 is a perspective view of a data storage system.
Figure 2:
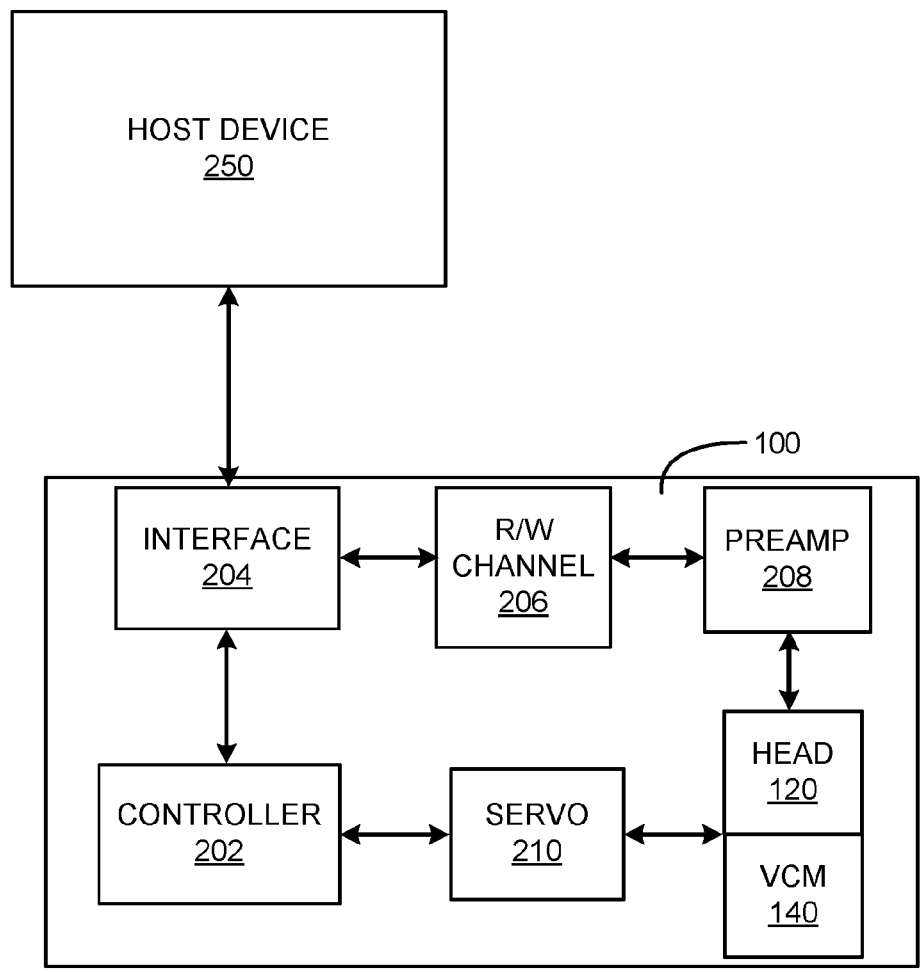
FIG. 2 is a generalized functional block diagram of a data storage system.

FIGS. 1 and 2 together show an illustrative operating environment in which certain specific embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure. The same reference numerals are used in different figures for same or similar elements.

Disc drive 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components. Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3A:
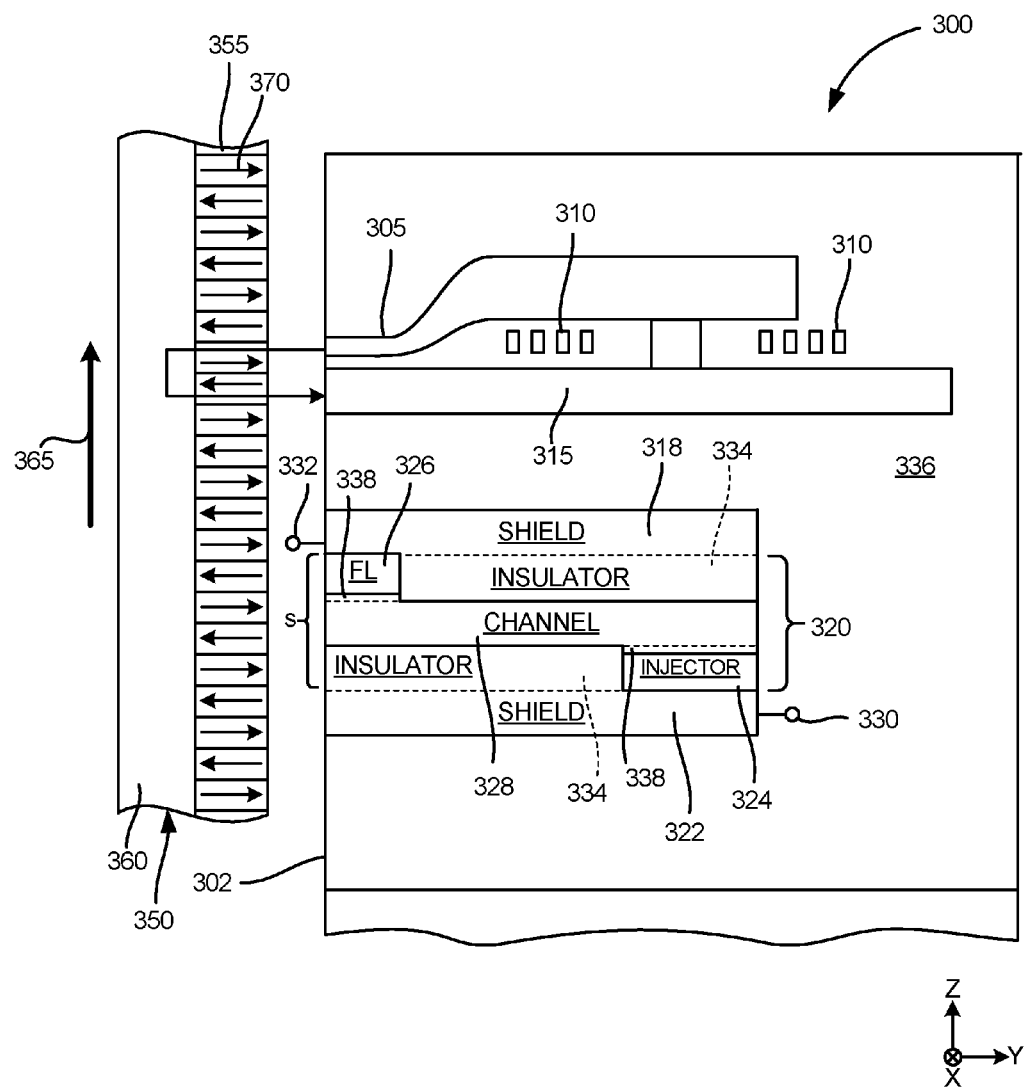
FIG. 3A is a schematic diagram of a cross-section of one embodiment of a recording head that reads from and writes to a storage medium.

FIG. 3A is a schematic diagram showing a cross-sectional view of portions of a recording head 300 and a data storage medium 350 taken along a plane substantially normal to a plane of a bearing surface (for example, an air bearing surface (ABS)) 302 of recording head 300. The recording head elements shown in FIG. 3A are illustratively included in a recording head such as recording head 120 in FIGS. 1 and 2. Medium 350 is illustratively a data storage medium such as medium 110 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 300 includes a write pole 305, a magnetization coil 310, a return pole 315, a top shield 318, a read transducer 320, a bottom shield 322 and a wafer overcoat 336. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

In the embodiment shown in FIG. 3A, read transducer 320 is a LSV reader. LSV reader 320 includes a spin injector 324, a detector 326 and a channel 328 that extends from spin injector 324 to detector 326. A suitable insulating material 334 may be disposed around the channel layer.

The spin injector 324 may include an electrically conductive, magnetic layer (not separately shown in FIG. 3A) that has a magnetization that is pinned in a direction (preferably perpendicular to the bearing surface). Pinning of the magnetization of the pinned magnetic layer may be achieved by, for example, exchange coupling with a layer of anti-ferromagnetic material (not separately shown in FIG. 3A). Alternatively, no anti-ferromagnetic layer may be used and the pinning of the magnetic layer may be achieved by shape anisotropy.

The detector 326 may include a magnetic, electrically conductive layer having a magnetization that is free to move in response to a magnetic field, and can therefore be referred to herein as a free layer (FL). In some embodiments, injector 324 and/or detector 326 may include additional layers such as thin electrically insulating barrier layers, which are described further below.

The portion of LSV reader 320 proximate to the bearing surface 302 does not include relatively thick synthetic antiferromagnetic (SAF) and antiferromagnetic (AFM) stacks that are typically present in, for example, current perpendicular-to-plane (CPP) Tunnel Junction Magnetoresistive (TMR) readers. Therefore, a spacing between top shield 318 and bottom shield 322 of LSV reader 320, which is denoted by s, is substantially less than a shield-to shield spacing in, for example, a CPP TMR reader. It should be noted that, in the interest of simplification, shield-to-shield spacing s in the Z-axis direction in FIG. 3A is shown as being uniform along a length (in the Y-axis direction) of LSV reader 320. However, in different embodiments, to accommodate a multi-layered injector 324, a shield-to-shied spacing away from the bearing surface 302 may be substantially greater than the shield-shield spacing s proximate to the bearing surface 302. In some embodiments, the multi-layered injector 324 may include a SAF structure, since the inclusion of such a structure may be advantageous for processing reasons.

For allowing a detection current to flow to detector 326, spin injector 324 is connected to a current source (not shown) via terminal 330. Detector 326 is connected to a suitable voltage measuring device (not shown) via terminal 332.

First, the detection current from the current source is made to flow through the spin injector 324 and through the channel 328. This flow of current causes electron spins to accumulate in channel 328, which then transports the spins to the detector 326.

When the spins are transported to the detector 326, an electric potential difference, which varies depending upon an external magnetic field, appears between the detector 326 and the channel 328. The voltage measuring device detects electric potential difference appearing between the detector 326 and the channel 328. In this manner, the LSV reader 320 can be applied as an external magnetic field sensor for detecting bits stored on a magnetic data storage medium such as 350.

Figure 3B:
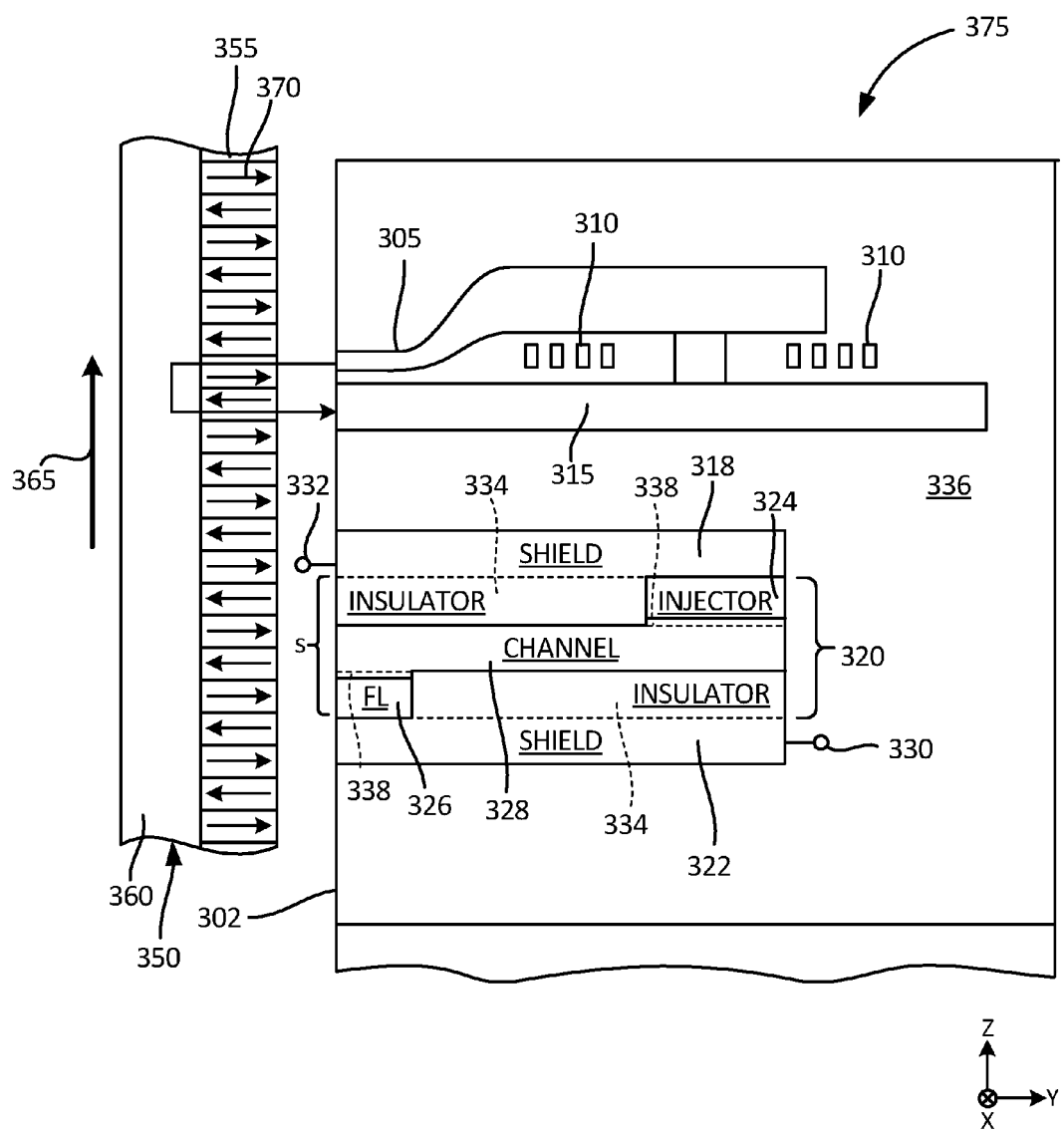
FIGS. 3B, 3C and 3D are schematic diagrams of cross-sections of other embodiments of a recording head that reads from and writes to a storage medium.
Figure 3C:
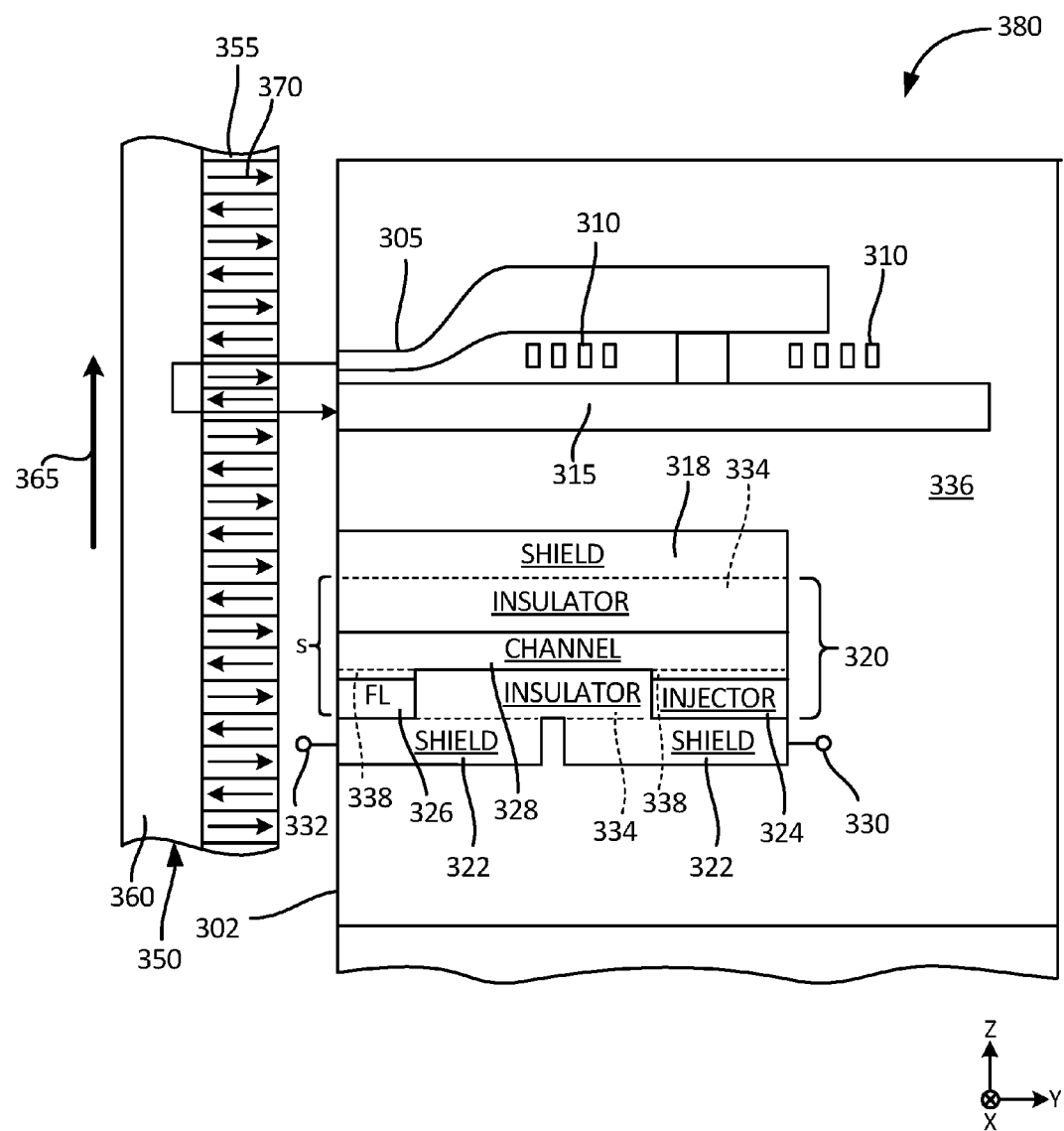
Figure 3D:
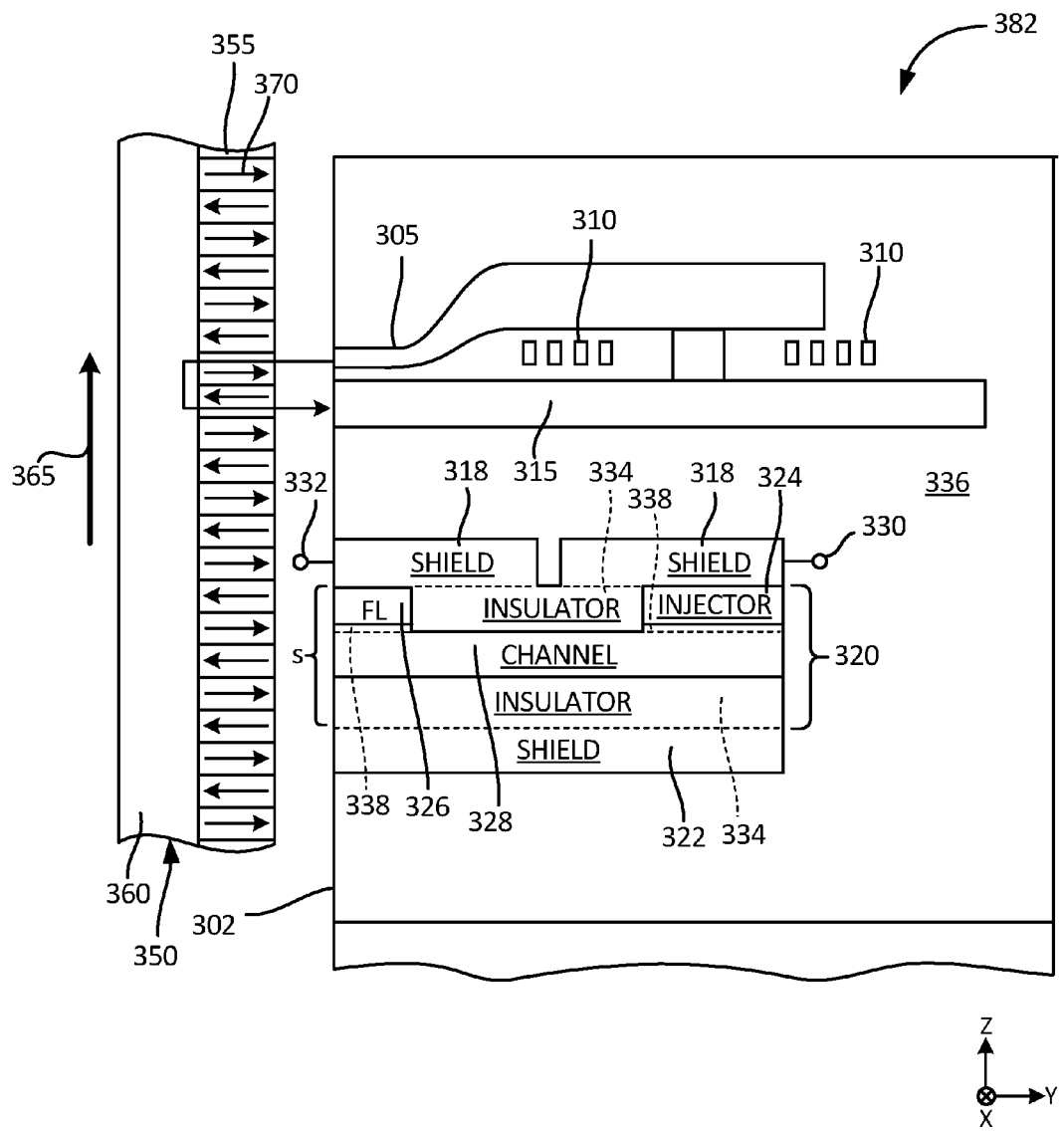

FIG. 3B shows an embodiment of a recording head 375 in which injector 324 is above channel 328 and detector 326 is below channel 328. In other respects, recording head 375 is substantially similar to recording head 300. FIGS. 3C and 3D show other embodiments of recording heads denoted by reference numerals 380 and 382, respectively. Other than injector 324 and detector 326 being on a same side of channel layer 328 in recording heads 380 and 382 and bottom shield 322 or top shield 318 being separated into two electrically-isolated portions, recording heads 380 and 382 are substantially similar to recording head 300.

As noted above, to increase an amplitude of the bit detection signal, different embodiments include multi-layered channels. In the embodiments shown in FIGS. 3A-3D, each of readers 300, 375, 380 and 382 includes a multi-layered channel. Specifically, in these embodiments, the multiple channel layers include channel layer 328 that extends between the injector 324 and the detector 326 and an additional channel layer 338 between the injector 324 and/or the detector 326 and channel layer 328. Fabrication of a LSV sensor of the type shown in FIG. 3C is described below with FIGS. 4A-4D.

Fabrication of LSV devices is a rather complicated task, and requires fine process control and engineering. One critical area of concern, which directly affects the device performance, is the interface between the injector/detector and the channel. The quality of the interface is critical to ensure good spin transport between the injector/detector and channel. Defects or impurities at the interface could become a source of spin scattering and spin flip, and result in a substantial loss of signal. One example of a fabrication technique that addresses these concerns is shown in FIGS. 4A-4D.

Figure 4A:
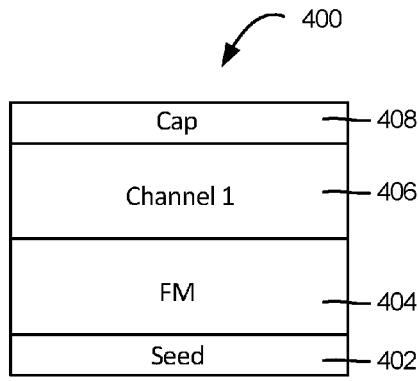
FIGS. 4A-4D are diagrammatic illustrations that show fabrication steps of a lateral spin valve reader.

FIG. 4A shows a thin film stack 400 formed by initial deposition steps of the LSV sensor fabrication process. The initial deposition steps involve first depositing a seed layer 402 on an under-layer or substrate (not shown in FIGS. 4A-4D). It should be noted that the substrate or under-layer can be, for example, an insulation layer such as alumina ($Al_2O_3$) or can include multiple layers with at least one of the multiple layers being an insulation layer. Other structures or devices in a head may also be in or below the under-layer or substrate. Seed layer 402 may comprise the shield layer 322 shown in FIG. 3C. A ferromagnetic (FM) layer 404 is deposited over the seed layer 402. Thereafter, a non-magnetic first channel layer (Channel 1) 406 is deposited over the ferromagnetic layer 404. A last step in forming the thin film stack 400 involves depositing a cap layer 408 over the first channel layer 406.

Figure 4B:
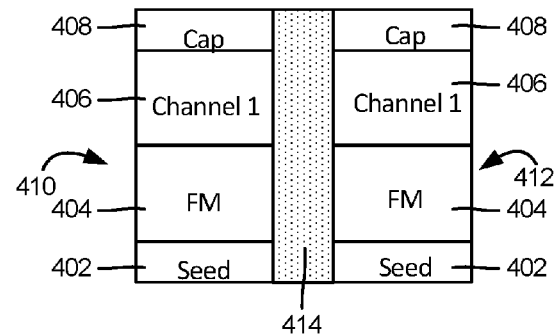
Figure 4C:
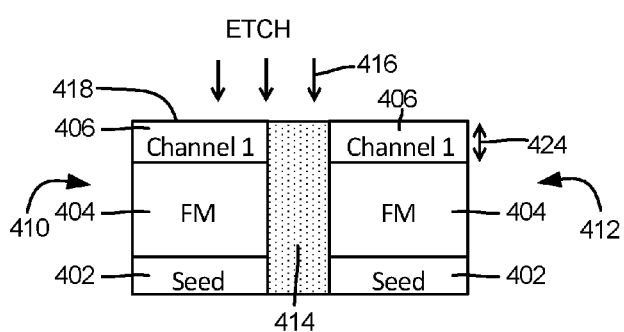
Figure 4D:
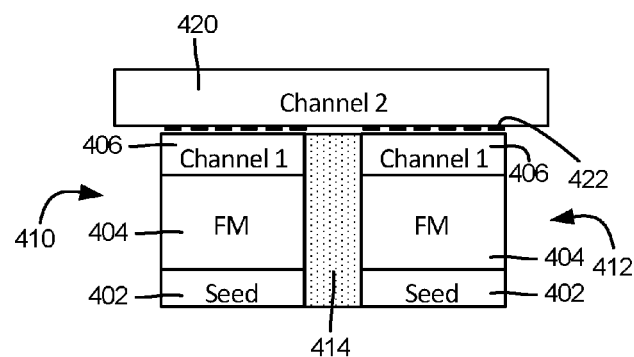

Once stack 400 is formed, an injector 410 and a detector 412 shown in FIG. 4B are patterned out of the stack 400 by photo lithography and ion beam milling, for example. In the interest of simplification, details of photo lithography and ion milling processes are not provided. Further, although a single injector 410 and a single detector 412 are shown in FIG. 4B, a number of injectors and detectors for a plurality of LSV readers may substantially simultaneously be formed. Areas between structures 410 and 412 may be filled with insulation material, which is denoted by reference numeral 414. The wafer shown in FIG. 4B is subjected to planarization by chemical mechanical polishing (CMP) or any other suitable process. Since, at this stage, a top surface of the stack/wafer has been exposed to various physical and chemical processes, etching of the top surface needs to be carried out to create an interface that is substantially free from contamination and physical damage. Accordingly, the top surface of the wafer shown in FIG. 4B is etched in a direction shown by arrows 416 in FIG. 4C. As can be seen in FIG. 4C, the etching process is carried out to entirely remove the cap layer 408 and also remove a portion of the first channel layer 406. Surface 418 of the first channel layer 406 is substantially free of contamination and serves as the upper surface of the wafer on which a second channel layer or common channel layer (Channel 2) 420 (shown in FIG. 4D) is deposited. As can be seen in FIG. 4D, the common channel layer 420 extends between the injector 410 and the detector 412. An interface 422 between the first channel layer 406 and the common channel layer 420 formed in this manner helps avoid spin scattering and spin flip.

As noted above in connection with FIG. 4C, the etch 416 is carried out such that it goes through to some thickness of the previously-deposited first channel layer 406. Experiments have shown that a post-etch thickness 424 of between 6 nanometers (nm) and 10 nm may be suitable for optimal LSV reader performance in some embodiments. However, in other embodiments, different post-etch thicknesses 424 may be suitable. In some embodiments, the first channel layer 406 and the second channel layer 420 are formed of a same material. In other embodiments, the first channel layer 406 and the second channel layer 420 may be formed of different materials. Suitable materials for channel layers 406 and 420 include non-magnetic metals such as Cu, Mg, Ag, etc. Channel 406 and or channel 420 may alternatively be formed of a two-dimensional semiconductor such as graphene or transition-metal dichalcogenide ($MoS_2$, $WS_2$, etc.). In general, any suitable material or materials may be used for the channel and any suitable number of layers may be employed for the channel. Although both injector 410 and detector 412 are shown as including a single ferromagnetic layer 404, injector 410 and or detector 412 may be multi-layered structures. In some embodiments, which are not separately shown, injector 410 may include a synthetic antiferromagnetic structure that is pinned by an antiferromagnetic layer.

In some embodiments, the different fabrication steps described in connection with FIGS. 4A-4D may be carried out within a single evacuated chamber (i.e., in-situ). In other embodiments, different fabrication steps such as the etching process 416 and the deposition of the common channel layer 420 may be carried out in different chambers, thereby subjecting the wafer to exposure to the environment between fabrication steps. In such embodiments, interface 422 is an ex-situ interface.

Figure 4E:
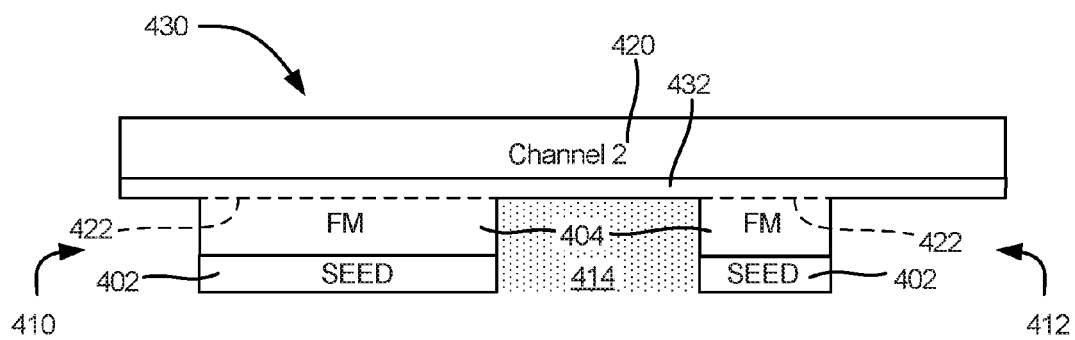
FIGS. 4E, 4F, 5 and 6 are diagrammatic illustrations of lateral spin valve readers in accordance with different embodiments.
Figure 4F:
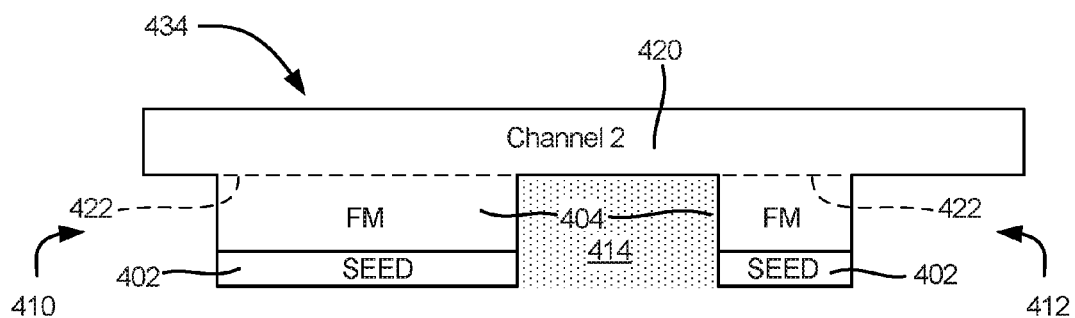

FIGS. 4E and 4F are diagrammatic illustrations of LSV sensor embodiments in which interface 422 is in locations other than the location shown in FIG. 4B. FIG. 4E shows an example LSV sensor 430 in which interface 422 is located at a junction of two ferromagnetic layers. The first of the two ferromagnetic layers is layer 404 within each of injector 410 and detector 412. The second ferromagnetic layer 432 extends between injector 410 and detector 412. FIG. 4F shows an example LSV sensor 434 in which interface 422 is at a boundary between ferromagnetic layer 404 and common channel layer 420.

In the embodiments described above in connection with FIGS. 4A-4F, both the injector 410 and the detector 412 are positioned on a same side of the common channel layer 420. Specifically, both the injector 410 and the detector 412 are positioned below the common channel layer 420, thereby providing a LSV sensor of the type shown in FIG. 3C. However, LSV sensors of the type shown in FIGS. 3A, 3B and 3D, for example, may also be formed with an interface such as 422.

Figure 5:
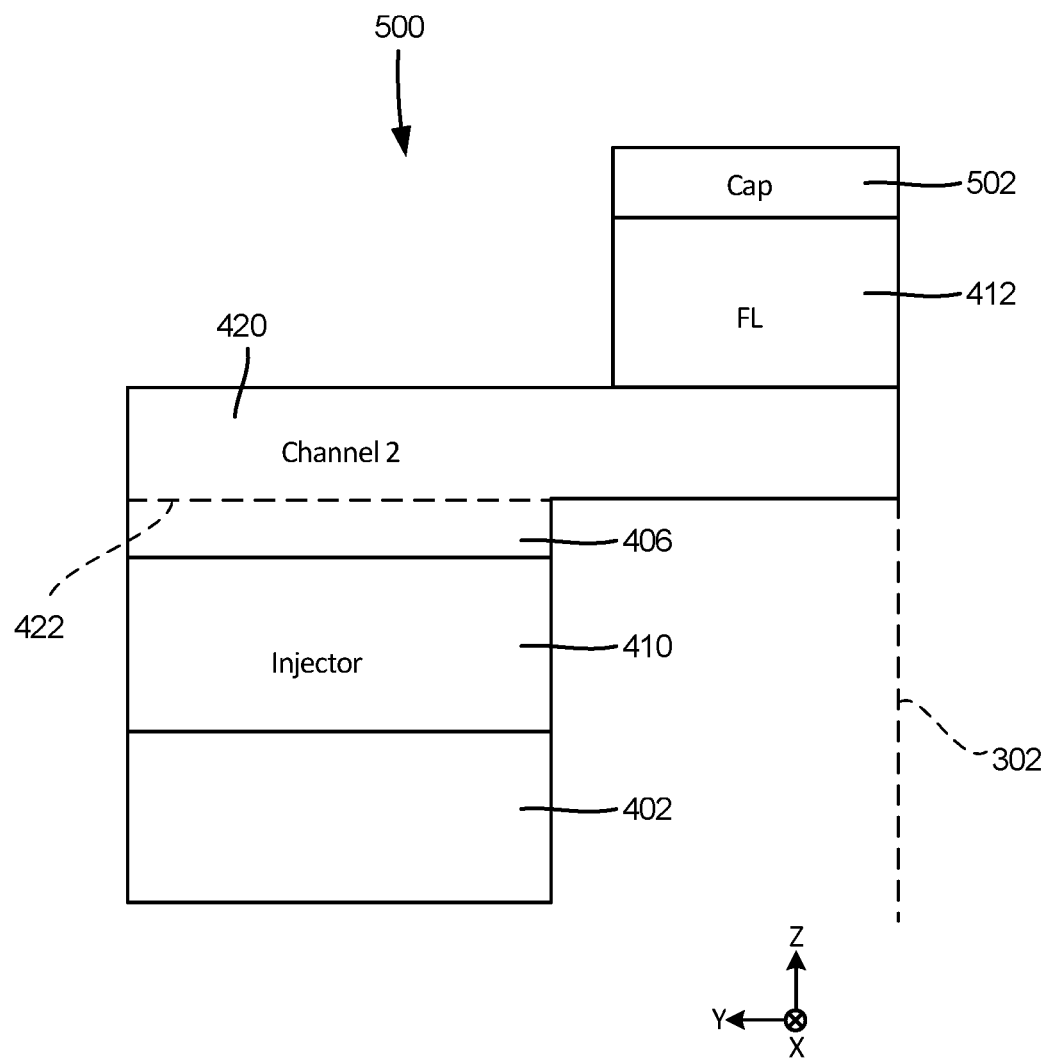

FIG. 5 is a diagrammatic illustration of a LSV sensor 500 of the type shown in FIG. 3A, which includes an interface 422 of the type shown in FIG. 4D. Fabrication of the injector 410 and the channel layers 406 and 420 is carried out in a manner described above in connection with FIGS. 4A-4D. Thereafter, a detector 412 is deposited over an end of the common channel layer 420 that is proximate to the bearing surface 302. A cap layer 502 is then deposited over the detector 412. Is should be noted that, in some embodiments, a thin barrier layer may be included between the injector 410 and/or the detector 412 and the channel layer 406/420. In other embodiments, no such barrier layer(s) may be included. LSV sensor embodiments with barrier layers are described further below in connection with FIGS. 9-11.

Figure 6:
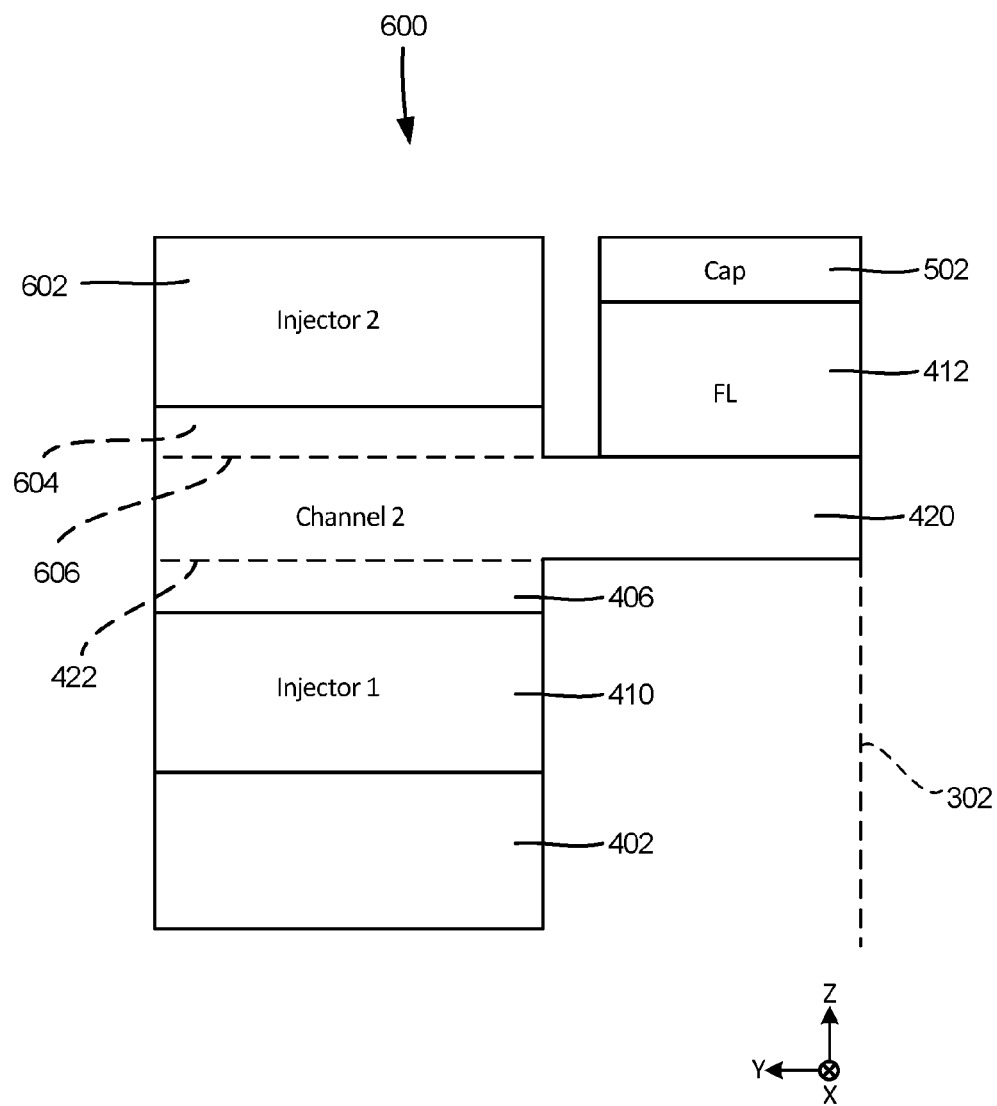

FIG. 6 is a diagrammatic illustration of a LSV sensor 600 that has elements that are substantially similar to the elements of LSV sensor 500 (of FIG. 5). However LSV sensor further includes an additional injector 602 and an additional channel layer 604. As can be seen in FIG. 6, both additional channel layer 604 and additional injector 602 are positioned above the common channel layer 420. Sensor 600 is fabricated in a manner described above in connection with FIGS. 4A-4D and therefore an additional interface 606 is formed at a junction of the common channel layer 420 and the additional channel layer 604. In the embodiment shown in FIG. 6, the two injectors 410 and 602 inject electron spins into the common channel layer 420.

Figure 7:
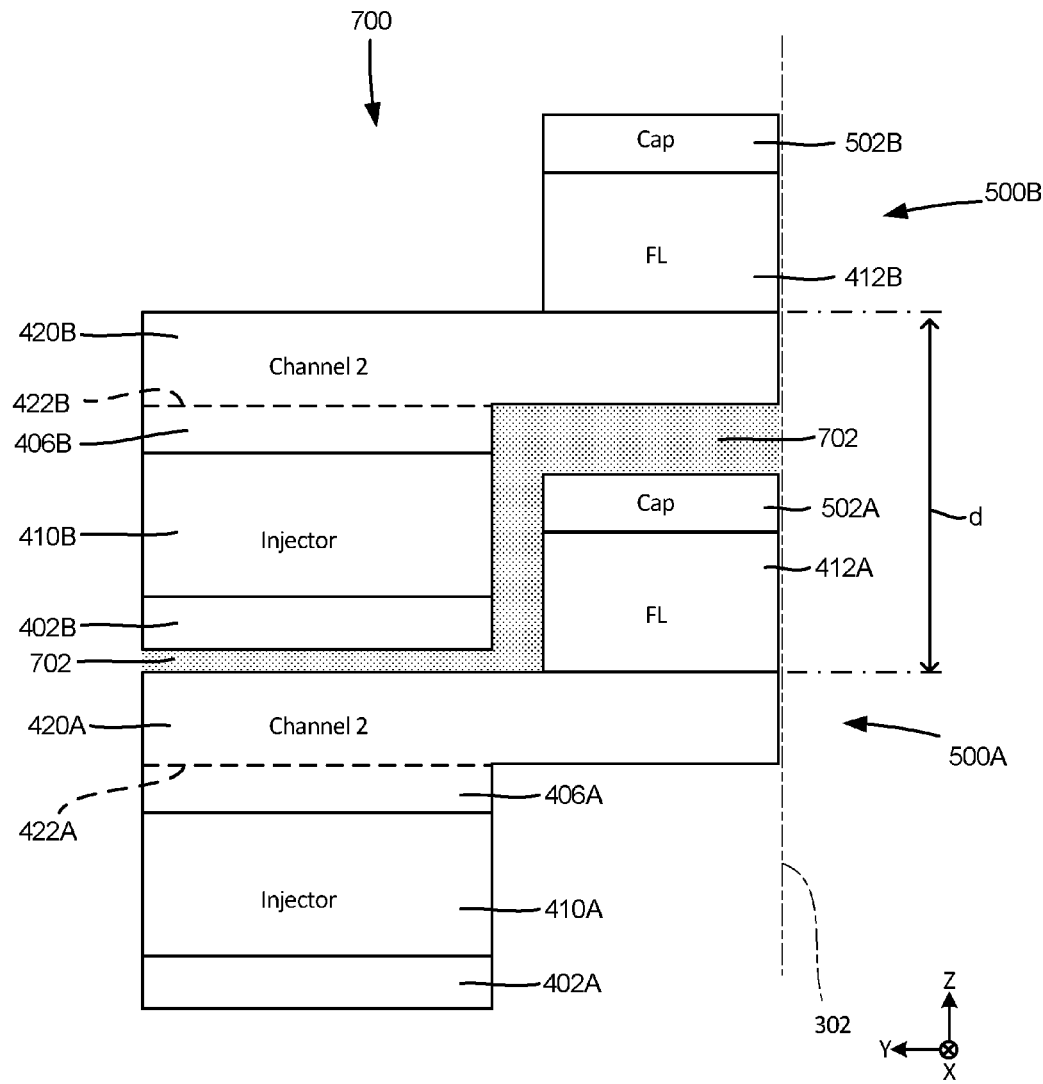
FIGS. 7 and 8 are diagrammatic illustrations of multi-sensor reader embodiments.
Figure 8:
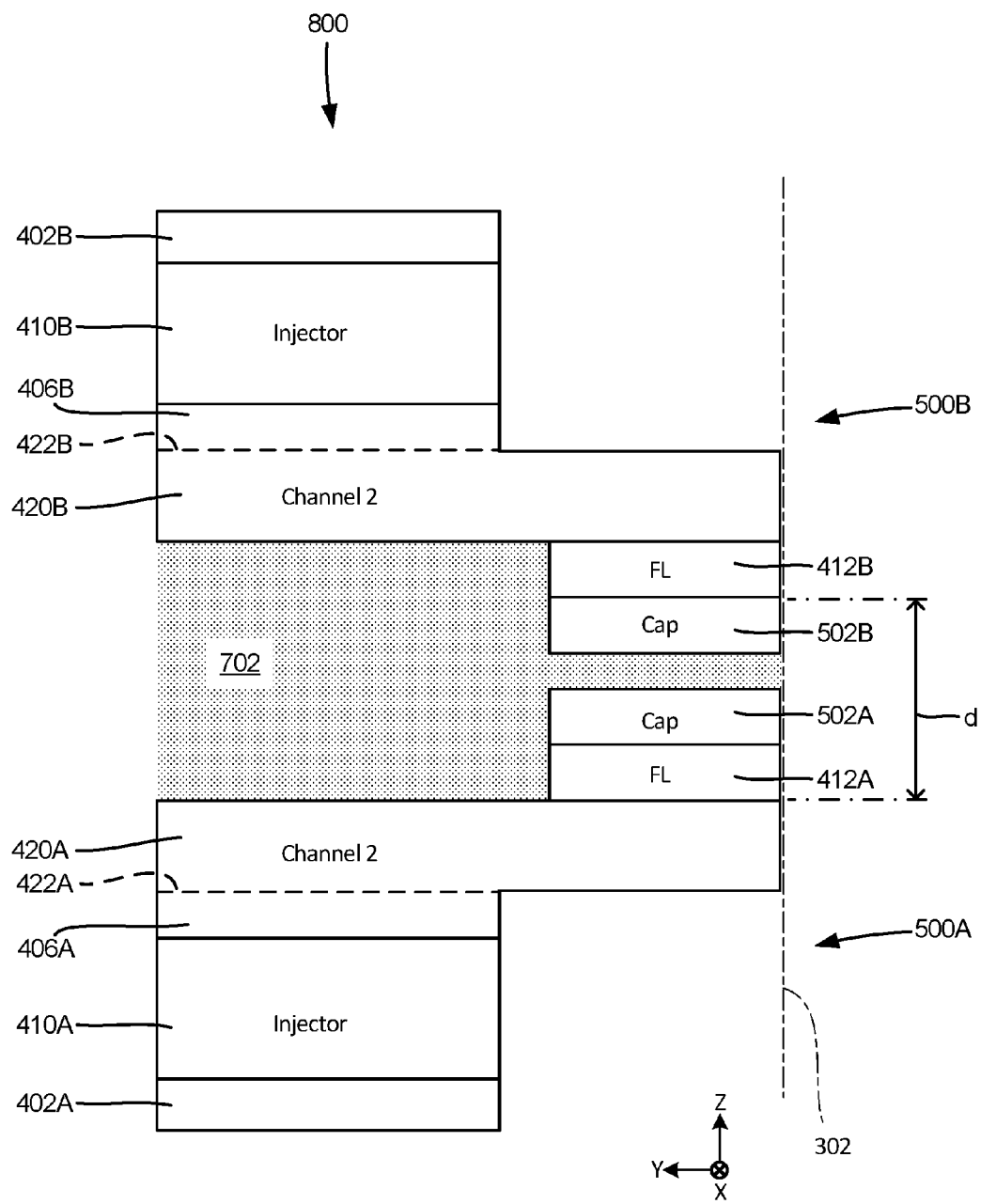

As indicated earlier in connection with the description of FIG. 3A-3D, a LSV reader has a substantially narrow shield-to-shield spacing proximate to a bearing surface such as 302. The shield-to-shield spacing in readers such as 320 of FIG. 3A and 500 of FIG. 5 is determined substantially by the channel and the free layer (FL). Therefore, it is a suitable reader design to implement in a multi-sensor configuration where two or more readers are stacked on top of each other within a single recording head. Examples of a dual-reader configuration are shown in FIGS. 7 and 8. The embodiment of reader 700 shown in FIG. 7 includes two sensors 500A and 500B of the type shown in FIG. 5 stacked one above the other. Sensor 500A includes a seed layer 402A, an injector 410A, a first channel layer 406A, a common channel layer 420A, an interface 422A (between the first channel layer 406A and the common channel layer 420A) a detector 412A and a cap layer 502A. Similarly, sensor 500B includes a seed layer 402B, an injector 410B, a first channel layer 406B, a common channel layer 420B, an interface 422B (between the first channel layer 406B and the common channel layer 420B) a detector 412B and a cap layer 502B. A suitable isolation layer 702 may be interposed between sensors 500A and 500B. In sensors 500A and 500B, injectors 410A and 410B are below the respective common channel layers 420A and 420B and detectors 412A and 412B are above the respective common channel layers 520A and 420B.

FIG. 8 shows another embodiment of a multi-sensor reader 800 that is similar to multi-sensor reader 700 of FIG. 7. The layers in both multi-sensor readers 700 and 800 are substantially similar. Additionally, lower sensor 500A in readers 700 and 800 have a same configuration. However, in sensor 500B of multi-sensor reader 800, injector 410B is positioned above the common channel layer 420B and detector 412B is positioned below the common channel layer 420B. Steps similar to those described above in connection with FIGS. 4A-4D may be employed to fabricate multi-sensor readers of the type shown in FIGS. 7 and 8.

In the multi-sensor configuration, a critical parameter is the FL-to-FL spacing, d (in FIGS. 7 and 8), and is conventionally set by the additive thicknesses of the stack SAF, mid-shields, and isolation layers. Reducing d enables the multi-sensor reader to be implemented in a higher linear density drive. Substantially drastic d-spacing reduction may be achieved by implementing LSV-based magnetic readers because, as noted above, they eliminate the thicknesses of SAF and AFM stacks at the bearing surface that are typically present in, for example, CPP TMR readers. In the LSV sensor configuration shown in FIG. 8, free layers 412A and 412B are even closer than in the embodiment of FIG. 7. Thus, reader 800 of FIG. 8 further leverages the inherent scalability of the LSV magnetic reader to reduce d.

In the embodiment described earlier in connection with FIGS. 4A-4D, for example, the first channel layer 406 is directly on the ferromagnetic layer 404. However, in some embodiments, a barrier layer is interposed between the ferromagnetic layer 404 and the first channel layer 406. One such embodiment is described below in connection with FIG. 9.

Figure 9:
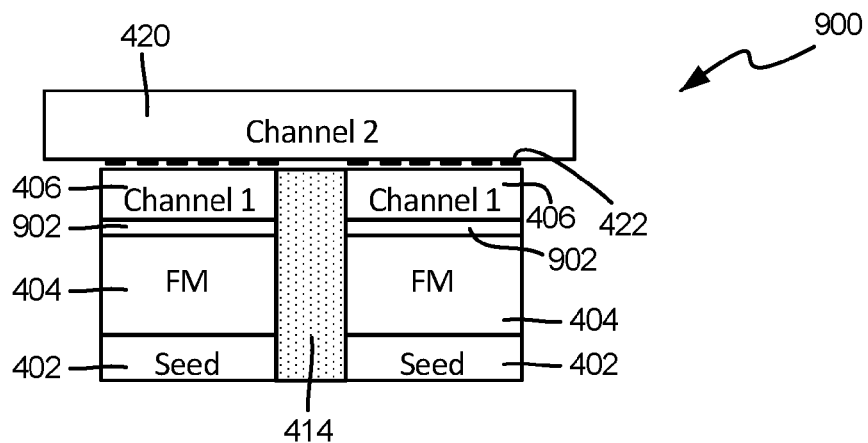
FIGS. 9-11 are diagrammatic illustrations of lateral spin valve readers that include barrier layers.

FIG. 9 is a diagrammatic illustration of a LSV sensor 900 that includes a barrier layer 902 in addition to the layers shown in FIG. 4D. Fabrication of LSV sensor 900 may be carried out using a process that is similar to that described in connection with FIGS. 4A-4D. However, during formation of an initial thin film stack (such as 400 of FIG. 4A), a barrier layer is deposited on ferromagnetic layer 404 using atomic layer deposition (ALD) or some other such suitable process. Thereafter, the first channel layer 406 is deposited on the barrier layer 902. Other than the additional step of depositing the barrier layer 902, the remaining steps for forming LSV reader 900 are similar to those described above in connection with FIGS. 4B-4D.

Figure 10:
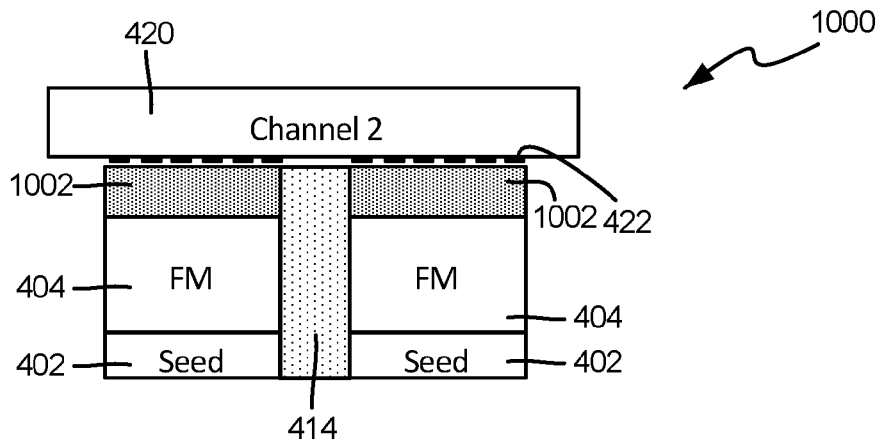

FIG. 10 is a diagrammatic illustration of a LSV sensor 1000 that includes a barrier layer 1002 in accordance with another embodiment. In the embodiment of FIG. 10, instead of a barrier layer being formed as a separately deposited layer such as 902 as described above in connection with FIG. 9, the first channel layer 406 is oxidized through its entire thickness to provide the barrier layer 1002. Specifically, the first channel layer 406 is etched in a manner described above in connection with FIG. 4C. After a suitable post-etch thickness of first channel layer 406 is obtained, the first channel layer 406 is oxidized using suitable thermal treatment, for example, to thereby provide barrier layer 1002. In one embodiment, first channel layer 406 is formed of copper (Cu) and the thermal treatment converts the first channel layer 406 into a Cu oxide species, thereby providing the barrier 1002. In such an embodiment, the common channel layer 420 may also be formed of Cu or, alternatively, any other suitable material or materials may be used for the common channel layer 420. In another embodiment, first channel layer 406 is formed of magnesium (Mg) and the thermal treatment converts the first channel layer 406 into magnesium oxide (MgO), thereby providing the barrier 1002. In such an embodiment, the common channel layer 420 may also be formed of Mg or, alternatively, any other suitable material or materials may be used for the common channel layer 420. In general, any suitable materials may be utilized in the embodiment of FIG. 10.

Figure 11:
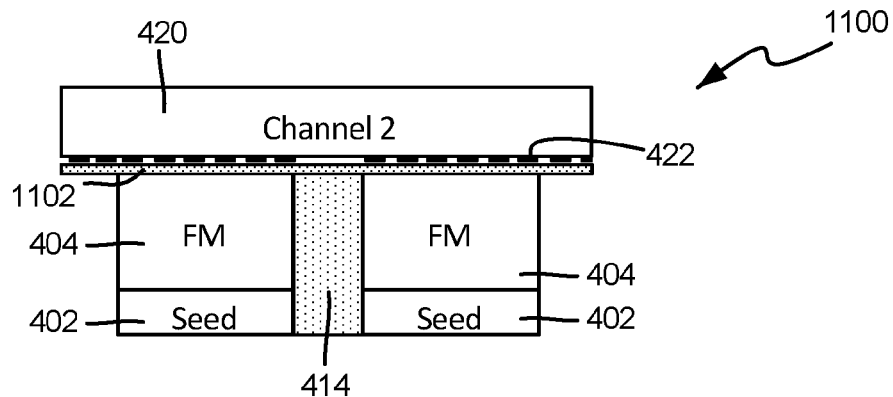

FIG. 11 is a diagrammatic illustration of a LSV sensor 1100 that includes a barrier layer 1004 in accordance with yet another embodiment. In the embodiment of FIG. 11, the first channel layer 406 is not deposited over the ferromagnetic layer 404 as described above in connection with FIGS. 9 and 10. Instead, after depositing the ferromagnetic layer 404 and performing fabrication steps of the type described earlier in connection with FIGS. 4B and 4C, barrier layer 1004 (for example, a suitable oxide layer) is deposited such that it covers the ferromagnetic layer 404 and the insulator 414 as shown in FIG. 11. Common channel layer 420 is then deposited on the barrier layer 1004 to form the LSV sensor.

Figure 12A:
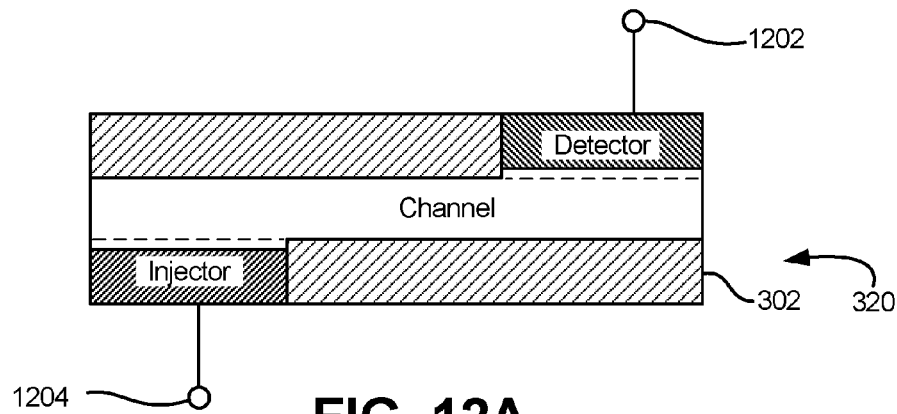
FIGS. 12A-12C are diagrammatic illustrations of lateral spin valve readers that include different terminal configurations.
Figure 12B:
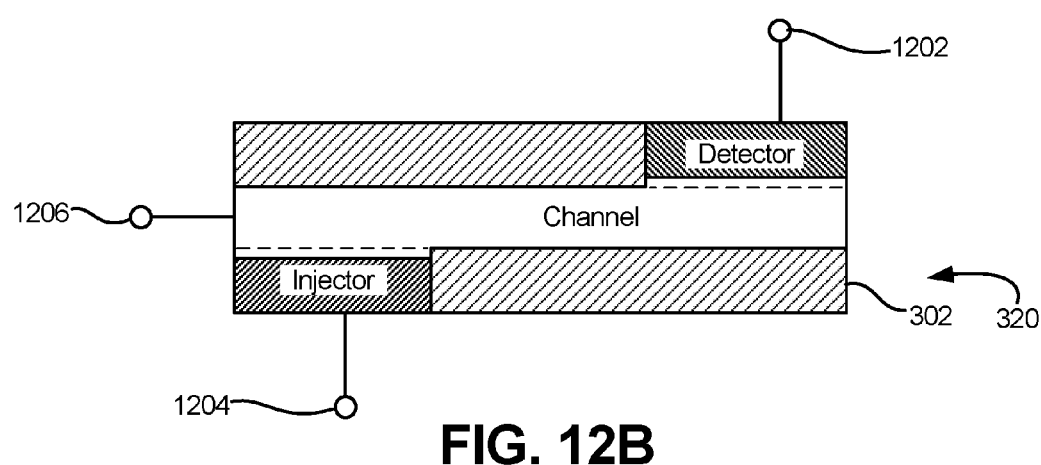
Figure 12C:
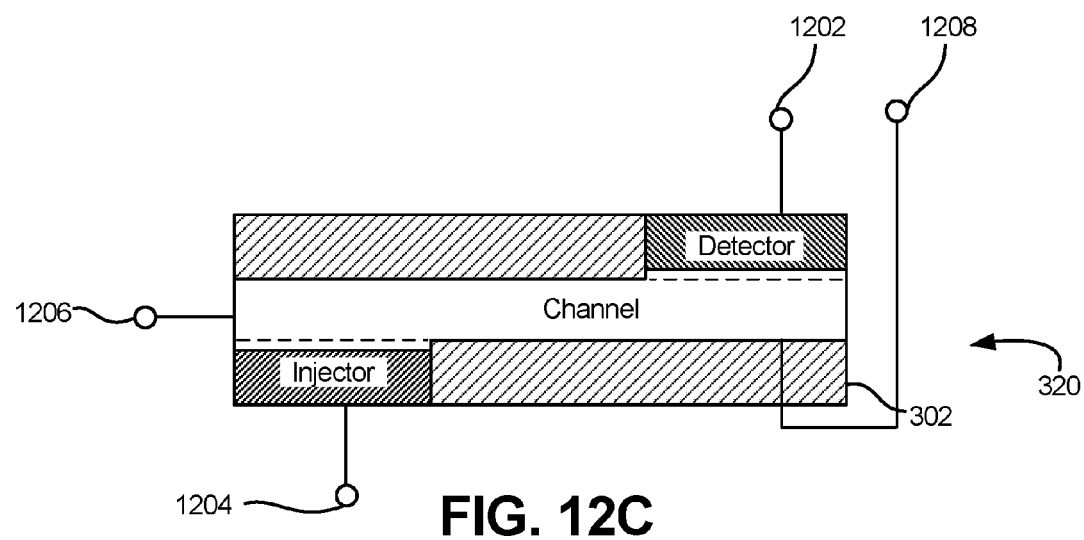

It should be noted that although FIGS. 9-11 show LSV sensors of the type shown in FIG. 3C, similar LSV sensors with barrier layers may be formed in the configurations shown in FIGS. 3A, 3B and 3D and may also be utilized in multi-sensor readers of the type shown in FIGS. 7 and 8. It is further noted that two, three, four, or any other number of contacts may be implemented in various embodiments of the LSV reader. The contact configuration utilized depends on a type of detection scheme and application. FIG. 12A shows an example of an LSV reader such as 320 that has a two-terminal/two-contact (1202 and 1204) configuration. FIG. 12B shows an example of an LSV reader 320 that has a three-terminal/three-contact (1202, 1204 and 1206) configuration, and FIG. 12C shows an example a four-terminal/four-contact (1202, 1204, 1206 and 1208) configuration. Although the embodiments described herein are directed to LSV readers utilized in a particular data storage system, it will be appreciated by those skilled in the art that the teachings of the present disclosure can be applied to other data storage devices without departing from the scope and spirit of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of fabricating a lateral spin valve reader comprising:
    forming an injector;
    forming a detector;
    forming a common channel layer that extends from the injector to the detector; and
    forming a first channel layer between the common channel layer and at least one of the injector or the detector with the first channel layer in contact with the common channel layer, thereby providing an interface between the first channel layer and the common channel layer.

2. The method of claim 1 and further comprising forming both the injector and the detector either above the common channel layer or below the common channel layer.

3. The method of claim 1 and further comprising forming one of the injector or the detector above the common channel layer and the other one of the injector or the detector below the common channel layer.

4. The method of claim 1 and further comprising forming a barrier layer between at least one of the injector or the detector and the first channel layer.

5. The method of claim 1 and wherein the first channel layer comprises a metal.

6. The method of claim 5 and further comprising oxidizing the metal in the first channel layer to form a barrier layer.

7. The method of claim 1 and wherein the first channel layer comprises a barrier layer that extends from the injector to the detector.

8. The method of claim 1 and wherein forming the injector, the detector, the common channel layer and the first channel layer comprises:
    forming a thin film stack by:
        depositing a seed layer;
        depositing a ferromagnetic layer over the seed layer;
        depositing the first channel layer over the ferromagnetic layer;
        depositing a cap layer over the first channel layer;

performing a material-removal process to divide the thin film stack in a direction perpendicular to the layers of the thin film stack into separate portions;

filling a trench formed by the material-removal process with an insulating material to form an intermediate structure comprising the separate portions and the insulating material therebetween;

etching an upper surface of the intermediate structure to remove the cap layer, a portion of the insulating material and a portion of the first channel layer;

depositing the common channel layer on a remaining portion the first channel layer.

9. The method of claim 8 and wherein forming the thin film stack further comprises depositing a barrier layer on the ferromagnetic layer prior to depositing the first ferromagnetic layer.

10. The method of claim 8 and further comprises oxidizing the remaining portion of the first channel layer to convert the first channel layer into a barrier layer before depositing the common channel layer.

11. A lateral spin valve reader comprising:
an injector;
a detector;
a common channel layer that extends from the injector to the detector; and
a first channel layer between the common channel layer and at least one of the injector or the detector with the first channel layer in contact with the common channel layer, thereby providing an interface between the first channel layer and the common channel layer.

12. The lateral spin valve reader of claim 11 and wherein both the injector and the detector are positioned either above the common channel layer or below the common channel layer.

13. The lateral spin valve reader of claim 11 and wherein one of the injector or the detector is positioned above the common channel layer and the other one of the injector or the detector is positioned below the common channel layer.

14. The lateral spin valve reader of claim 11 and further comprising a barrier layer between at least one of the injector or the detector and the first channel layer.

15. The lateral spin valve reader of claim 11 and wherein the first channel layer comprises a metal.

16. The lateral spin valve reader of claim 11 and wherein the first channel layer comprises a metal-oxide barrier layer.

17. The lateral spin valve reader of claim 16 and wherein the metal-oxide barrier layer extends from the injector to the detector.

18. A multi-sensor reader within a single recording head, the multi-sensor reader comprising:
a plurality of lateral spin valve sensors stacked one above the other, wherein each of the plurality of lateral spin valve sensors comprises:
an injector;
a detector;
a common channel layer that extends from the injector to the detector; and
a first channel layer between the common channel layer and at least one of the injector or the detector with the first channel layer in contact with the common channel layer, thereby providing an interface between the first channel layer and the common channel layer.

19. The multi-sensor reader of claim 18 and wherein, in each of the plurality of lateral spin valve sensors, the injector is positioned below the common channel layer and the detector is positioned above the common channel layer.

20. The multi-sensor reader of claim 18 and wherein, in a lower one of the plurality of lateral spin valve sensors, the injector is positioned below the common channel layer and the detector is positioned above the common channel layer, and wherein, in an upper one of the plurality of lateral spin valve sensors, the detector is positioned below the common channel layer and the injector is positioned above the common channel layer.

* * * * *